(12) United States Patent
Ketola

(10) Patent No.: US 7,395,313 B2
(45) Date of Patent: Jul. 1, 2008

(54) METHOD AND SYSTEM FOR CONTROLLING MULTIPLE REMOTE MAILBOXES SIMULTANEOUSLY CONNECTED TO A PLURALITY OF PDP CONNECTIONS OF A GPRS SYSTEM

(75) Inventor: Pekka Ketola, Tampere (FI)

(73) Assignee: Nokia Corporation, Espoo (FI)

( * ) Notice: Subject to any disclaimer, the term of this patent is extended or adjusted under 35 U.S.C. 154(b) by 640 days.

(21) Appl. No.: 09/897,354

(22) Filed: Jul. 2, 2001

(65) Prior Publication Data
US 2002/0002591 A1   Jan. 3, 2002

(30) Foreign Application Priority Data
Jul. 3, 2000  (FI)  .................................. 20001595

(51) Int. Cl.
G06F 15/16 (2006.01)
H04M 1/00 (2006.01)
H04L 12/66 (2006.01)
(52) U.S. Cl. .................. 709/206; 370/352; 455/566
(58) Field of Classification Search ................ 709/206; 379/88.13–88.22; 455/566
See application file for complete search history.

(56) References Cited

U.S. PATENT DOCUMENTS

| | | | |
|---|---|---|---|
| 5,333,266 A * | 7/1994 | Boaz et al. ................... 709/206 |
| 5,479,472 A | 12/1995 | Campana, Jr. et al. ......... 379/58 |
| 5,647,002 A * | 7/1997 | Brunson ...................... 709/206 |
| 5,956,486 A | 9/1999 | Hickman et al. ........ 395/200.36 |
| 6,018,762 A | 1/2000 | Brunson et al. .............. 709/206 |
| 6,169,911 B1 * | 1/2001 | Wagner et al. ............... 455/566 |
| 6,233,318 B1 * | 5/2001 | Picard et al. .............. 379/88.17 |
| 6,411,685 B1 * | 6/2002 | O'Neal ..................... 379/88.14 |
| 6,519,327 B1 * | 2/2003 | Cannon et al. ........... 379/88.22 |
| 6,563,912 B1 * | 5/2003 | Dorfman et al. ......... 379/88.13 |
| 6,636,502 B1 * | 10/2003 | Lager et al. .................. 370/352 |
| 2003/0145059 A1 * | 7/2003 | Burgard et al. .............. 709/206 |

FOREIGN PATENT DOCUMENTS

WO  WO 98/32273 A1 * 7/1998
WO  WO 00/11585   3/2000

OTHER PUBLICATIONS

"Eudora Pro Email Version For Windows 4.2" User Manual, Qualcomm Corp., retrieved from the internet 2003.
"Analysis Of Multi-Slot MAC Protocols Proposed For The GSM Phase 2+ General Packet Radio Service", Brasche et al., Vehicular Technology Conference, 1997, pp. 1295-1300.

* cited by examiner

*Primary Examiner*—Wen-Tai Lin
(74) *Attorney, Agent, or Firm*—Perman & Green, LLP

(57) ABSTRACT

The invention relates to a system for controlling at least a first and a second remote mailbox located in at least one e-mail server, in a terminal. Between the terminal and the e-mail server maintaining the first remote mailbox, and between the terminal and the e-mail server maintaining the second remote mailbox, at least partly simultaneous connection is arranged to be established, wherein the remote mailboxes are arranged to be controlled by means of the terminal substantially simultaneously by means of the connections.

18 Claims, 5 Drawing Sheets

METHOD AND SYSTEM FOR CONTROLLING MULTIPLE REMOTE MAILBOXES SIMULTANEOUSLY CONNECTED TO A PLURALITY OF PDP CONNECTIONS OF A GPRS SYSTEM

BACKGROUND OF THE INVENTION

1. Field of the Invention

The disclosed embodiments relates to the system, method and terminal according to independent claims.

2. Brief Description of Related Developments

At present, the GSM mobile network (Global System for Mobile Communications) is one of the most popular and most extensive wireless networks. In addition to the conventional speech connection the network provides its users with other data services. The utilization of a signalling channel enables the transmission of text messages between subscribers, and the GSM data service provides for a 9.6 kbit/s connection via a conventional circuit-switched connection, or a considerably faster connection via a high speed circuit-switched connection HSCSD (High Speed Circuit Switched Data) developed for the GSM mobile network. In current data transmission, the same basic method as in the speech transmission is used, i.e. the connection is provided with one TDMA (Time Division Multiple Access) time slot, by means of which a 9.6 kbitis circuit-switched service is attained, or with several time slots if a high speed circuit switched connection is used.

The GSM Data service is used nearly in all GSM networks and its popularity is clearly increasing. The current service is suitable to be utilized for the transmission of facsimiles, reading of e-mails and possibly for the transmission of files of smaller size. In the future, one of the most important embodiments will likely be the remote use of Internet in a wireless communication device. For this purpose, and for example for the transmission of images, faster connections are required. The expansion of Internet on a growing number of fields also increases the number of potential users. Wireless networks have to keep up with the landline networks, and thus it has to be possible to transfer data even faster. One solution for this need is the GPRS technology (General Packet Radio Service), by means of which it is possible reach a connection of even 184 bit/s in solutions of prior art.

One aim of the GPRS is to provide the users of the GSM system with high quality packet network services by utilizing the already existing GSM infrastructure and protocols as much as possible. The GPRS packet service efficiently utilizes the capacity of the radio link and it can quite well be applied in the transfer of burst data. GPRS is a general packet service based on the development of the GSM system, which enables the act of applying different packet protocols in one network. In practice, the most important protocol is IP (Internet protocol), but the standards also support X.25.

One GPRS subscriber can have several different PDP (Packet Data Protocol) connections. When the subscriber activates a PDP connection according to IP, an IP address is activated for the subscriber, on the basis of which it is possible to transmit packages for the subscriber, and on the basis of which the packages of the subscriber are transmitted to an external IP network. The GPRS backbone network conducts the transform between the IP address and the internal addressing of the GSM, and it is capable of controlling the mobility of the subscriber. Thus, the GPRS system looks externally like an ordinary subnetwork of the Internet network. The mobility of the terminals cannot be detected outside the GPRS system either.

The use of e-mail in communication has become considerably more common in the recent years. Typically, one person can send and receive several e-mail messages within one day. At present, e-mail is used not only for transmission of messages related to work but also for transmission of personal messages. The ease and cheapness of sending e-mail messages have for their part also increased the use of e-mail in communication. Furthermore, e-mail is at present used for the transmission of such messages which are of low importance and whose transmission with other kinds of transmission methods is thus not reasonable at all.

Because the use of e-mail is so common, at present several people have a number of various e-mail addresses and remote mailboxes (electronic mailbox, e-mail box) related thereto. The concept of an remote mailbox refers to a property, such as a memory provided in an e-mail server, by means of which the owner of the remote mailbox can receive e-mail messages. For this remote mailbox an unique address is determined, which is typically of the format name@domain.com, wherein the e-mails can be directed from the receiving e-mail server to the correct remote mailbox by means of this address. The e-mail server is a computer (server) which communicates with the data transmission network. The e-mail server can, for example, be a server connected to the local area network of a company, or a server of an operator providing for e-mail services, which is known as such.

Generally, such a person has at least one e-mail address provided by the employer, which e-mail address is primarily used for taking care of matters related to work. For personal purposes, such a person usually has an e-mail address provided by a service provider e.g. by an Internet operator. In addition to these addresses, e-mail addresses provided by different schools and other organizations may also be available.

Persons, who have several remote mailboxes in their use, often want to actively use several of the remote mailboxes available. The reason for this may be, for example, that one wishes to keep matters related to work and personal matters apart, or some remote mailboxes are only intended for a particular field of the work, e.g. for customer feedback. Thus, the problem is how the person in question receives information on the messages that have arrived in the different remote mailboxes. Another problem is how the person in question can easily send messages from different remote mailboxes.

At present, it is known that from the remote mailboxes it is possible to forward all messages or messages fulfilling a certain condition to another e-mail address. Thus, it is possible to collect the e-mail messages from all remote mailboxes in use for example to only one remote mailbox. In that case, it is, however, quite difficult to determine in which remote mailbox the message has already arrived. Another problem in this case is that e-mail messages that have arrived can be answered easily only from the remote mailbox to which the message has finally been transmitted. There are also programs which check the desired remote mailboxes at intervals, and send a notification if at least one message has arrived in any of the remote mailboxes. However, these programs merely function as signalling devices, and thus they cannot be used for handling e-mail messages.

Many e-mail programs are capable of simultaneously handling only one remote mailbox. Thus, the remote mailbox has to be changed from the settings of the program, and thus the change cannot be conducted very rapidly and/or very easily. Furthermore, one has to remember a number of various settings, which are usually different for every remote mailbox. There are also e-mail programs, which are capable of handling several remote mailboxes. In these programs, the mailbox to be used is typically selected when the program is activated, i.e. several remote mailboxes cannot be used simultaneously. When the application is running, it is only possible to move from one remote mailbox to another by reactivating the program and by selecting another remote mailbox.

The patent publication U.S. Pat. No. 5,956,486 discloses one such e-mail program (accessor) in which the aim is to gain access to more than one remote mailbox by means of the same e-mail program. This is implemented in such a manner that settings necessary for using several remote mailboxes, such as the address of the remote mailbox, access settings of the messages, etc., are determined in the e-mail program. The user can also determine how often the e-mail program checks whether new messages have arrived in the remote mailbox (polling). Even though it has been presented in this publication that it is possible to use several remote mailboxes with one e-mail program, they are not, in fact, used simultaneously. In practice, the e-mail program may communicate with only one of the selected remote mailboxes at a time. When the examination is switched to another remote mailbox, the e-mail program has to make the terminal first to disconnect the existing connection, and thereafter the setting up of a new connection has to be started. The connection is advantageously set up by means of a modem, or if the terminal is a working station connected to a local area network, the connection can be established also via a server of the local area network.

There are known devices, such as notebook computers, small handheld computers or PDA devices (Personal Digital Assistant) available for storing different kind of information. In these devices it is possible to store for example calendar information, notes, address information, phone numbers or corresponding information given by the user. Data is typically entered in these devices by means of a keyboard. Data can also be entered by using a computer connected to the device. In some devices it is also possible to store text information also by writing it directly on a touch screen for example with a pen-like object. The capacity of these devices is constantly increasing, and they already contain various properties known from PC devices (Personal Computer). For some devices there are expansion cards according to the PCMCIA standard (Personal Computer Memory Card International Association) available for the purpose of connecting these devices e.g. to mobile phones. Thus, for example by means of PDA devices it is for example possible to utilize radio waves for wireless transmission and reception of telefax messages, short massages (SMS, Short Message service) and other text files. In this description, the concept of a PDA device refers to devices according to the description above.

As is well known, there are also devices available in which the functions of the wireless communication device and a PDA device are combined together, wherein it is not necessary to use separate auxiliary devices, such as PCMCIA cards. One such known device is the Nokia Communicator 9110, by means of which it is possible to communicate with the Internet network, conduct mobile phone functions, such as the reception of a call and selection of a phone number, and to receive for example telefax messages. The properties of wireless communication devices, such as mobile phones are constantly increasing, and they typically comprise functions e.g. for presenting images on the display of the wireless communication device. In this description, the concept of a wireless communication device refers to such a wireless communication device, which can contain functions of the above-described PDA device or a corresponding device.

One purpose of the invention is to attain a method and apparatus by means of which it is possible to use several remote mailboxes simultaneously in such a manner that different remote mailboxes are not, however, mixed with each other.

It is possible to attain this purpose in such a manner that each e-mail server, which one wishes to use simultaneously, is advantageously provided with a PDP connection with its own. Thus, it is possible to provide the user interface of the e-mail program with a possibility to control several different remote mailboxes simultaneously. In the e-mail program, the different remote mailboxes are distinguished from each other by means of unique identifications, such as icons and/or names of the remote mailboxes, wherein the user can determine the remote mailbox to which each function and notification relates.

SUMMARY OF THE INVENTION

More precisely, the system according to the invention is characterized in what will be presented in the characterizing part of claim 1. Furthermore, the method according to the invention is characterized in what will be presented in the characterizing part of claim 8. Moreover, the terminal according to the invention is characterized in what will be presented in the characterizing part of claim 15.

With the present invention considerable advantages are attained. When the user can in the same working station or other computer suitable for using the e-mail program, handle messages located in several remote mailboxes, s/he can easily receive messages that have arrived in different remote mailboxes. In addition, s/he can easily send e-mail messages from different remote mailboxes. These procedures can be conducted without having to restart the program and possibly change the settings. Furthermore, it is not necessary for any of the e-mail servers to be aware of the fact that the user has access to several remote mailboxes simultaneously.

BRIEF DESCRIPTION OF THE DRAWINGS

In the following, the invention will be described in more detail with reference to the appended drawings, in which.

DETAILED DESCRIPTION OF THE PREFERRED EMBODIMENT(s)

Technically, the control of several remote mailboxes substantially simultaneously can be implemented in various ways. At present, the most suitable solution in connection with wireless communication devices is the GPRS system. Because of this, a wireless communication device and the GPRS system will be used as examples in this description. It is, of course, obvious that the invention can also be applied in other contexts. For example, the terminal can be a PC device (Personal Computer) connected to a telecommunication network. Instead of the GPRS system it is also possible to use another solution to attain several simultaneous connections to e-mail servers.

In the example case, the connection to several remote mailboxes is based on PDP connections of the GPRS system. By means of the PDP architecture it is possible to have a simultaneous connection to several e-mail servers which can also be in different networks. Thus, it is possible to communicate with an Intranet of a company, which is protected with a firewall, and with the public Internet. In other words the technique for several simultaneous connections already exists in the GPRS system, but this possibility has not been used for controlling several remote mailboxes simultaneously. Thus, this description concentrates on the functional definition.

Figure 1:
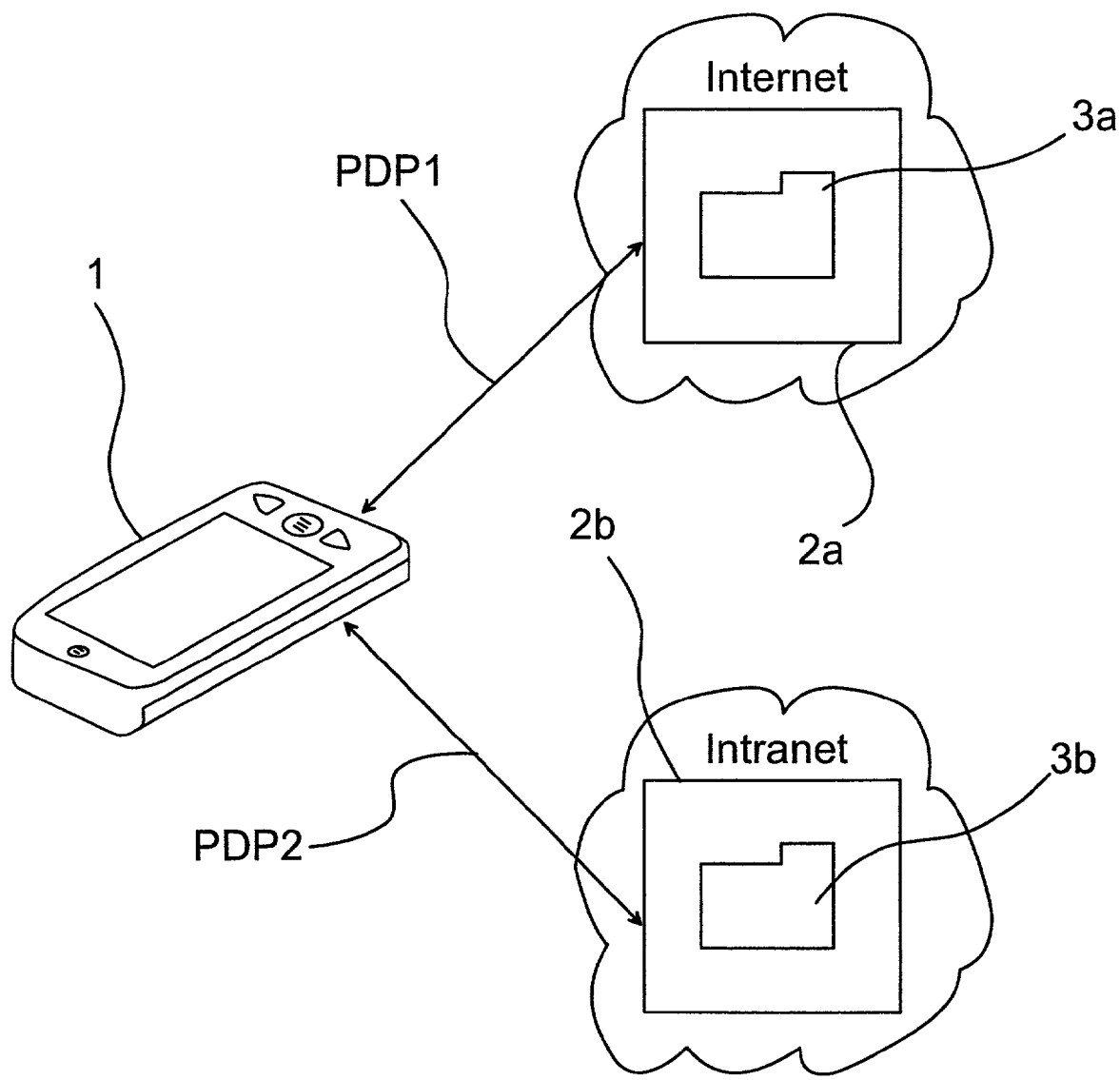
FIG. 1 shows a system according to a preferred embodiment of the invention, in which two remote mailboxes are controlled simultaneously.

FIG. 1 shows a system according to a preferred embodiment of the invention, in which two mailboxes 3a, 3b are controlled simultaneously. In this case, a first PDP connection PDP1 is set up from a wireless communication device 1 to an e-mail server 2a located in the Internet network, in which server the user of the wireless communication device has at least a first remote mailbox 3a. Furthermore, a second PDP connection PDP2 is set up from the wireless communication device to an e-mail server 2b located in an internal Intranet of a company, in which server the user has a second remote mailbox 3b. It is, of course, possible that these remote mailboxes 3a, 3b are located in the same server 2a, 2b. In such a case the wireless communication device 1 has at least two simultaneous connections.

The connection from the wireless communication device 1 to the mobile communication network implementing the GPRS system can be set up in a manner known as such for example by means of a GPRS attach function, in which the mobile communication network and the wireless communication device conduct signalling in order to transmit information necessary in the connection set-up between the wireless terminal and the mobile communication network. The connection can be set up for example when the user of the wireless communication device 1 switches on the wireless communication device 1, when the user goes to his/her workplace, at a moment of time specified by the user, or otherwise under the control of the user. Furthermore, all connections do not have to be set up simultaneously. The user can, for example, determine, that for his/her private e-mail the connection is set up when the wireless communication device 1 is switched on or substantially immediately after that. On the other hand, the user can define the connection set-up to the e-mail related to work to take place at working days at a specific time of the day. Correspondingly, the connection detach can be defined in a desired manner, e.g. so that it takes place at the end of a working day, when the wireless communication device 1 is switched off, etc. The connection detach does not have to occur simultaneously either.

When several remote mailboxes are controlled simultaneously, the different remote mailboxes and the messages related thereto are advantageously separated in the user interface. This can be implemented for example by indicating the mailbox in which the message in question belongs to in connection with each e-mail. This method can be used in e.g. text-based user interfaces, such as wireless communication devices. Another advantageous alternative is to place the messages belonging to different remote mailboxes to different windows, displays or under menus, wherein the remote mailbox on view is indicated for example in the upper edge of the display, or by restricting the alternatives to the alternative in use at a given time. Thus, it is possible to move from one remote mailbox to another advantageously from the icon representing the remote mailbox in question, or from an option in the menu. This alternative is preferably used in graphic user interfaces.

Figure 2:
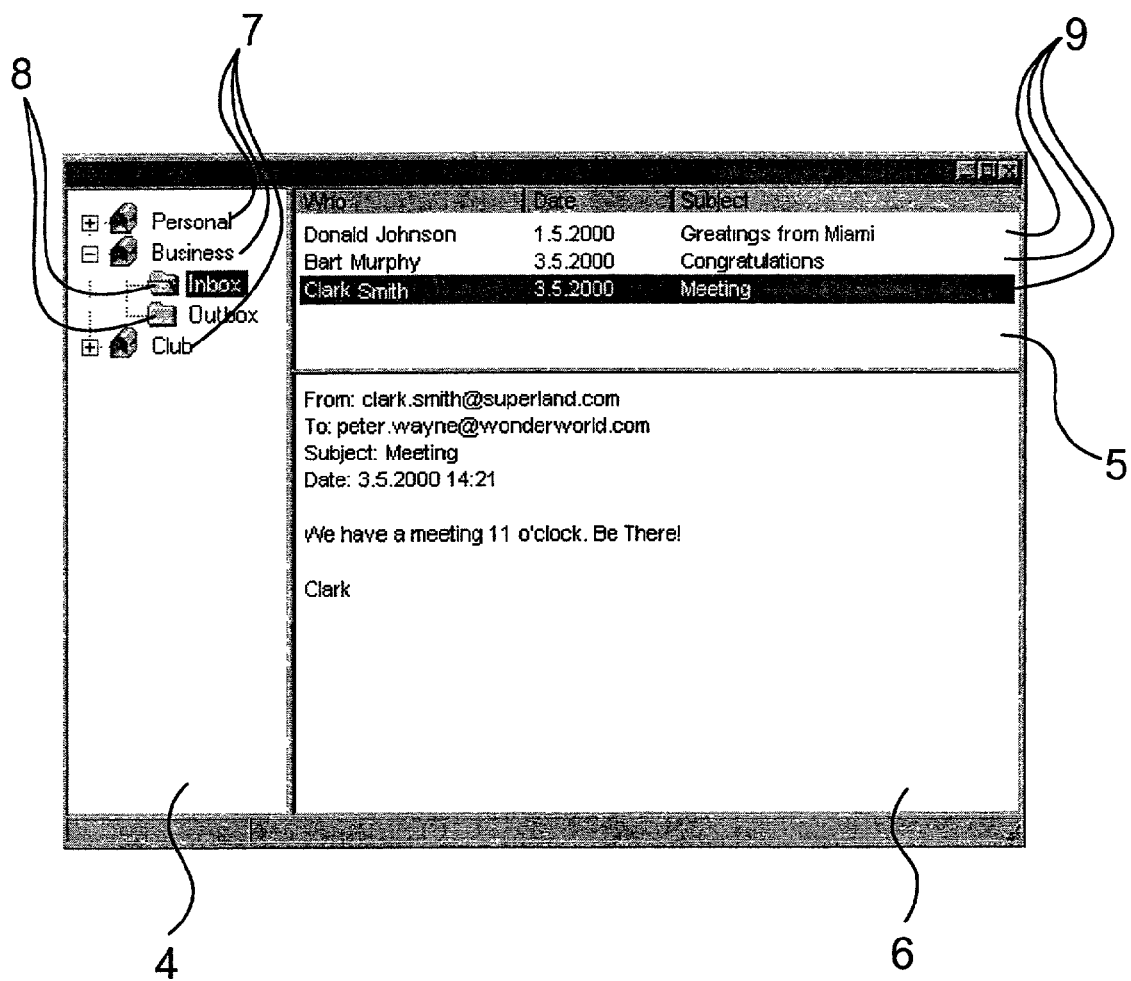
FIG. 2 shows a user interface of an e-mail program according to a preferred embodiment of the invention.

FIG. 2 shows a preferred alternative for implementing a user interface. The user interface is divided into three parts. The first field is a hierarchically expandable remote mailbox menu 4 in the left-hand side of the user interface, from which it is possible to select an remote mailbox 7 (e.g. Personal, Business and Club) and files 8 (e.g. Inbox and Outbox) contained in the remote mailbox. In this menu, the function selected at a given time is limited. For example in FIG. 2, the messages that have arrived to the Business remote mailbox are selected. The second field is a message menu 5 in the upper righthand side of the user interface, which displays the messages 9 contained in the file of the remote mailbox selected in the remote mailbox menu 4. In this menu, the function selected at a given time is also limited. The third field is a message display 6 on the lower righthand side of the user interface, which shows the message selected in the message menu 5.

Figure 3:
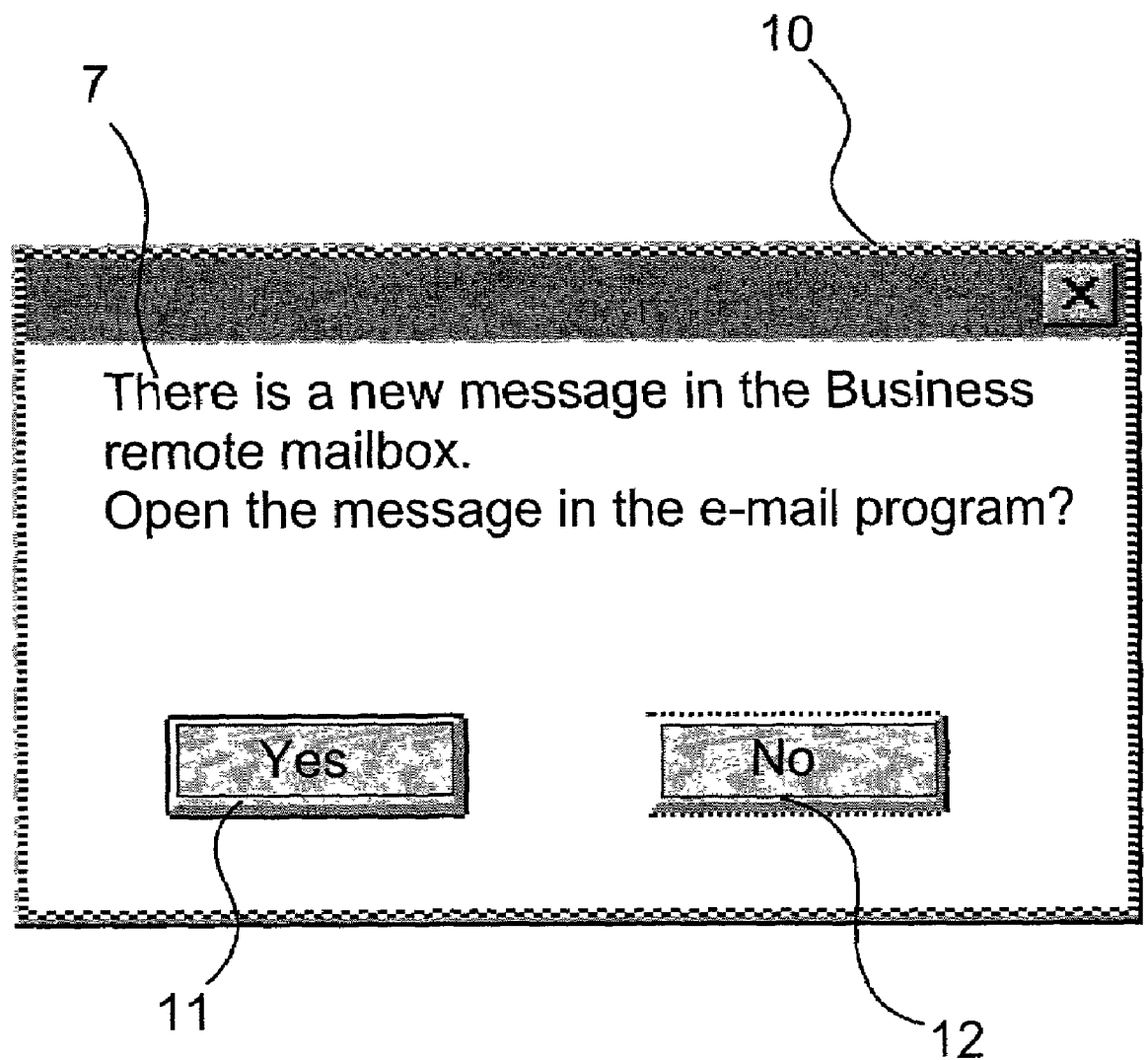
FIG. 3 shows a window according to a preferred embodiment of the invention, notifying of an e-mail message that has arrived.

When the e-mail message arrives, the user advantageously has to be informed of the e-mail message that has arrived as soon as possible, in a similar manner as in solutions of prior art, for example by means of an opening notification window. In addition, when several remote mailboxes are controlled at the same time, the user has to preferably know to which remote mailbox the message has arrived so that it is not necessary to go through each remote mailbox separately to find the message that has arrived. Advantageously, the user is informed of the e-mail message that has arrived by opening a separate notification window 10 (FIG. 3), in which the different remote mailboxes can be distinguished from each other in several ways. For example each remote mailbox has its own individual name and icon. The user can also be informed of e-mail messages that has arrived by indicating a number of new arrived messages e.g. beside the name of the remote mailbox. The notification may also contain a direct link to the actual remote mailbox, wherein it is possible to read the e-mail that has arrived easily by acknowledging the notification for example with a Yes-button 11. If the e-mail program is not open, it is also possible to activate it and an remote mailbox therein as a result of the acknowledgement, from which remote mailbox a new message can be found. If the user does not want to open the e-mail message that has arrived, s/he can for example acknowledge the notification by pressing a NO-button 12, wherein the notification window is closed without opening the e-mail message that has arrived. It is, of course, obvious that the notification of the message that has arrived can also be given in another manner, for example by means of a signal, or in a notification text in the status line.

Figure 4:
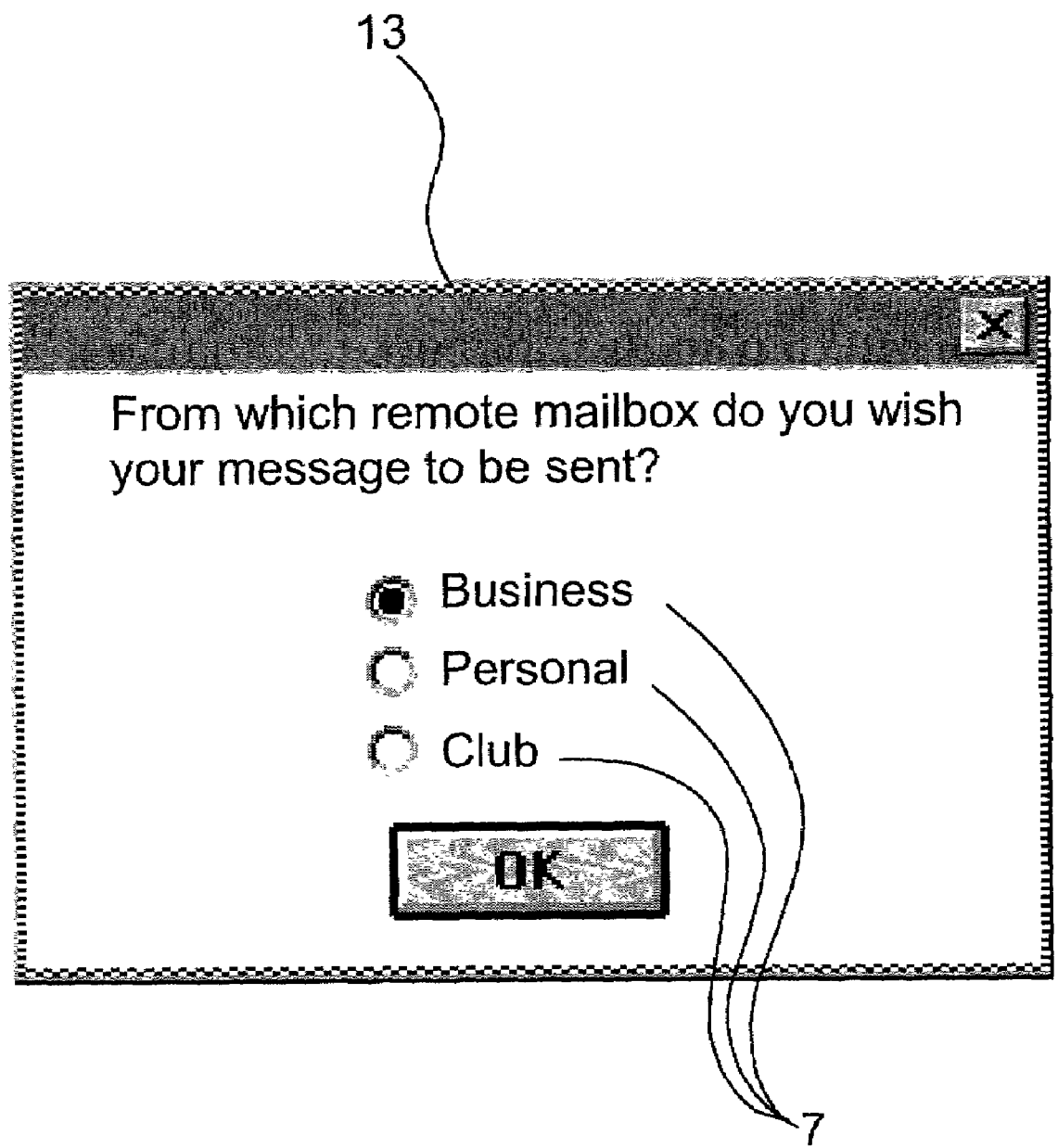
FIG. 4 shows a selection window according to a preferred embodiment of the invention for an outgoing e-mail message.

In the process of transmitting an e-mail message and answering an e-mail message that have arrived, there has to be way of selecting the remote mailbox from which one wishes to send the message. When an e-mail message is answered, it is advantageous to use the same remote mailbox to which the original e-mail has arrived. It is, of course, possible to change the remote mailbox for example by means of a menu function. When new e-mail is transmitted, it is advantageous to use the remote mailbox which has been selected in the e-mail program at the moment of transmission. Another advantageous alternative is that when e-mail is transmitted, the user is inquired e.g. in a separate notification window 13 (FIG. 4) from which remote mailbox the message in question is transmitted. This selection can also be conducted in the menu located in the message window of the e-mail. Another advantageous alternative is to use a predetermined remote mailbox in all e-mails transmitted, if some other remote mailbox is not separately selected.

Figure 5:
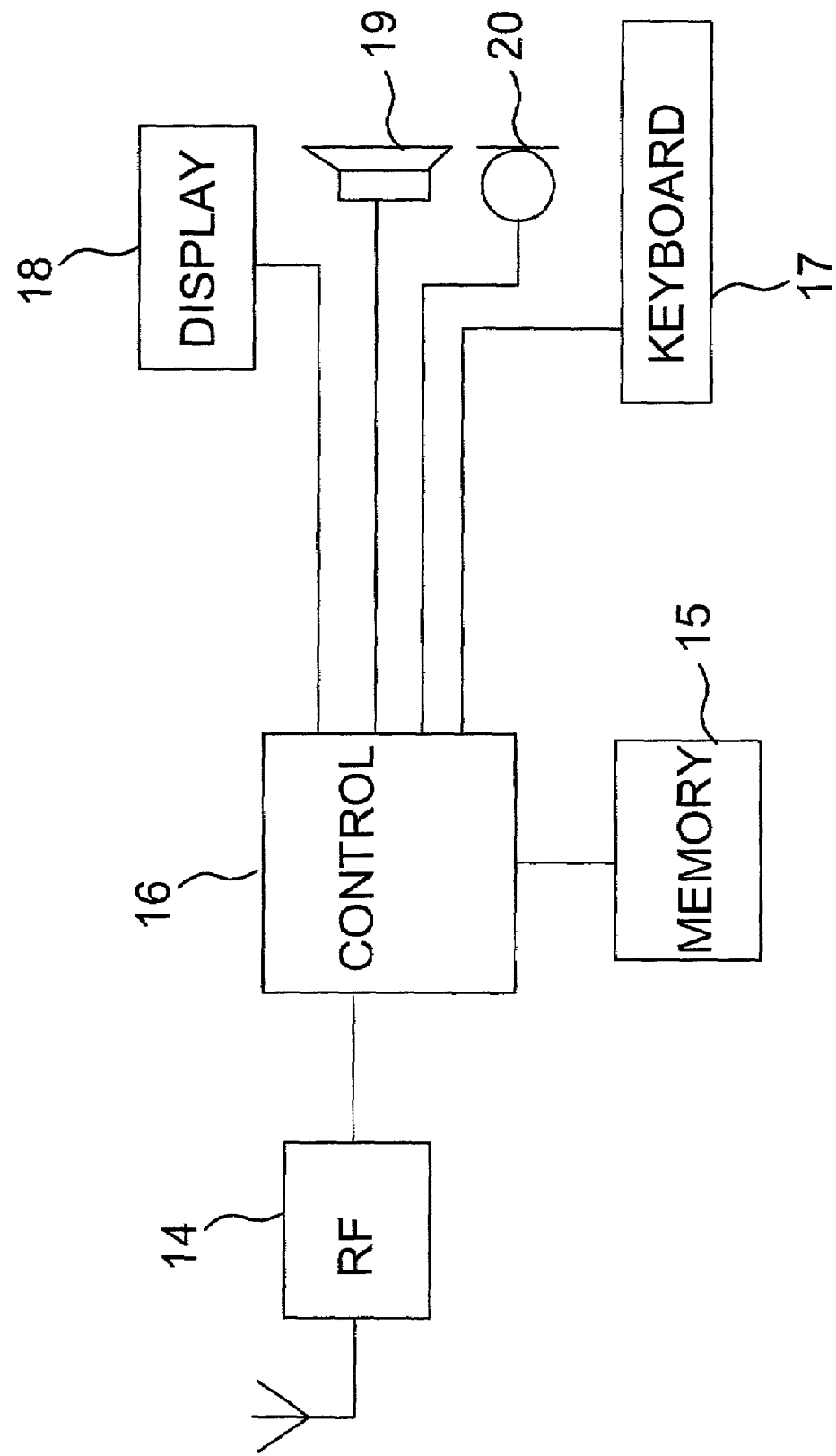
FIG. 5 shows a wireless terminal according to a preferred embodiment of the invention in a reduced block diagram.

Furthermore, the appended FIG. 5 shows a wireless terminal 1 according to a preferred embodiment of the invention in a reduced block diagram. The wireless terminal 1 advantageously comprises at least a radio part 14 for arranging data transmission between the wireless terminal and a telecommunication network 2a, 2b, and memory means 15 and a control unit 16. The control unit 16 is used for controlling the functions of the wireless terminal 1, for example the control of a keyboard 17, a display 18 and audio means 19, 20, the execution of the programs, etc. The memory means 15 of the wireless terminal 1 are used for storing of e.g. programs, information during operation, settings, such as the operating settings of an e-mail program, and, if necessary, for the storing of e-mails as well. The functions necessary for applying the present invention can advantageously be implemented in connection with the control unit 16 to a large degree.

The present invention is not restricted solely to the embodiments presented above, but it can be modified within the scope of the appended claims.

The invention claimed is:

1. A system for controlling at least two remote mailboxes, located in at least two e-mail servers comprising:
at least a first PDP connection of a GPRS system between a wireless terminal and an e-mail server maintaining a first remote mailbox, and,
a second PDP connection of the GPRS system between the wireless terminal and another e-mail server maintaining a second remote mailbox,
an e-mail program stored in a memory to be used for controlling said remote mailboxes, which e-mail program is provided with a user interface, and said e-mail program is provided with the capability to control said remote mailboxes simultaneously within the same user interface,
said wireless terminal comprising a control unit for controlling said remote mailboxes simultaneously with the first and second PDP connections, wherein the first and second PDP connections are simultaneously maintained, and comprise different PDP connections.

2. The system according to claim 1, wherein each remote mailbox is provided with a unique identification.

3. The system according to claim 2, in which a notification of an e-mail message that has arrived in one of said remote mailboxes is arranged to be produced for a user, wherein said notification is arranged to be provided with a unique identification of that remote mailbox to which the e-mail message has arrived.

4. The system according to claim 2, in which the user of the e-mail program is provided with the capability to formulate and send e-mail messages, wherein the e-mail program is adapted to select the e-mail address of the user, and to attach the selected e-mail address of the user to the e-mail message to be transmitted.

5. The system according to claim 2, in which the user of the e-mail program is provided with the capability to reply to the e-mail messages that have arrived, wherein the system attaches by default the address of the remote mailbox in which the e-mail message to be answered has arrived to a reply message as an address of the sender of the reply message.

6. A method for controlling at least two remote mailboxes located in at least two e-mail servers comprising:
establishing a first PDP connection of a GPRS system between an e-mail server maintaining a first remote mailbox and a wireless terminal;
establishing a second PDP connection of the GPRS system between another e-mail server maintaining a second remote mailbox and the wireless terminal; wherein the first PDP connection and the second PDP connection are not the same connection;
maintaining the first PDP connection and the second PDP connection simultaneously; and
using an e-mail program stored in a memory for controlling said remote mailboxes, which e-mail program is provided with a user interface,
controlling said remote mailboxes simultaneously within the same user interface of said e-mail program,
controlling the first remote mailbox and the second remote mailbox with the wireless terminal simultaneously with the first and second PDP connections.

7. The method according to claim 6, comprising using an e-mail program for controlling said the first and second remote mailboxes, in which e-mail program it is possible to control several remote mailboxes substantially simultaneously, and in which each remote mailbox has its own unique identification such as an icon or a name.

8. The method according to claim 7, in which, when a new e-mail message arrives in any of said remote mailboxes, the method comprises forming a notification of the e-mail message that has arrived for a user, and providing said notification with a unique identification of that remote mailbox to which the e-mail message has arrived.

9. The method according to claim 7, in which in the e-mail program the user can formulate and send e-mail messages, wherein the method comprises selecting in the e-mail program the e-mail address of a user and attaching the selected e-mail address of the user to the e-mail message to be transmitted.

10. The method according to claim 7, comprising replying in the e-mail program by a user to the e-mail messages that have arrived, and attaching by default the address of the remote mailbox to which the e-mail message to be answered has arrived, to a reply message as an address of the sender of the reply message.

11. A wireless terminal comprising:
a control unit for controlling at least a first and a second remote mailbox located in at least two e-mail servers,
a communication module for establishing a first PDP connection of a GPRS system between the wireless terminal and an e-mail server maintaining the first remote mailbox, and for establishing a second PDP connection of the GPRS system, the second PDP connection being a different connection from the first PDP connection, between the wireless terminal and an e-mail server maintaining the second remote mailbox simultaneously with the first PDP connection,
and an e-mail program stored in a memory to be used for controlling said remote mailboxes, which e-mail program is provided with a user interface, and said e-mail program is provided with the capability to control said remote mailboxes simultaneously within the same user interface, wherein
said control unit is configured for controlling said at least two remote mailboxes simultaneously by the first and second PDP connections.

12. The wireless terminal according to claim 11, wherein each remote mailbox is provided with a unique identification, such as an icon or a name.

13. The wireless terminal according to claim 12, comprising means for producing a notification of an e-mail message that has arrived in one of said remote mailboxes for a user, and means for providing said notification with a unique identification of that remote mailbox to which the e-mail message has arrived.

14. The wireless terminal according to claim 12, comprising means for formulating e-mail messages and means for transmitting e-mail messages, wherein said e-mail program is adapted to select the e-mail address of a user, and to attach the selected e-mail address of the user to the e-mail message to be transmitted.

15. The wireless terminal according to claim 12, comprising means for answering the e-mail messages that have arrived, and means for attaching by default the address of the remote mailbox to which the e-mail message to be answered has arrived, to a reply message.

16. A GPRS system comprising means for establishing PDP connections, means for controlling by a wireless terminal at least a first and a second remote mailbox located in at least two e-mail servers, comprising means for arranging at least a first PDP connection of the GPRS system between the wireless terminal and an e-mail server maintaining said first remote mailbox and a second PDP connection of the GPRS system between the wireless terminal and another e-mail server maintaining said second remote mailbox, the second PDP connection comprising a connection different from the first PDP connection, and said wireless terminal comprising an e-mail program stored in a memory to be used for controlling said remote mailboxes, which e-mail program is provided with a user interface, and said e-mail program is provided with the capability to control said remote mailboxes simultaneously within the same user interface, and a control unit for controlling said remote mailboxes simultaneously by means of said PDP connections.

17. A wireless communication device comprising means for controlling at least a first and a second remote mailbox located in at least two e-mail servers in a system comprising means for arranging at least a first PDP connection of a GPRS system between the wireless communication device and a first e-mail server maintaining said first remote mailbox and a second PDP connection of the GPRS system between the wireless communication device and a second e-mail server maintaining said second remote mailbox, wherein the second PDP connection is not the same as the first PDP connection, said wireless communication device further comprising an e-mail program to be used for controlling said remote mailboxes, which e-mail program is provided with a user interface, and said e-mail program is provided with the capability to control said remote mailboxes simultaneously within the same user interface, and said means for controlling at least a first and a second remote mailbox being adapted to control said at least first and second remote mailboxes simultaneously by means of said first and second PDP connections.

18. A wireless terminal comprising:
  means for controlling at least a first and a second remote mailbox located in at least two e-mail servers,
  means for establishing a first PDP connection of a GPRS system between the wireless terminal and an email server maintaining the first remote mailbox,
  means for establishing a second PDP connection of the GPRS system, the second PDP connection being a different connection from the first PDP connection, between the wireless terminal and an e-mail server maintaining the second remote mailbox simultaneously with the first PDP connection,
  an e-mail program stored in a memory to be used for controlling said remote mailboxes which e-mail program is provided with a user interface, and said e-mail program is provided with the capability to control said remote mailboxes simultaneously within the same user interface, and
  means for controlling said at least two remote mailboxes simultaneously by the first and second PDP connections.

\* \* \* \* \*